Sept. 4, 1956     S. C. ROCKAFELLOW     2,761,967
TIMING RELAY
Filed Nov. 10, 1952
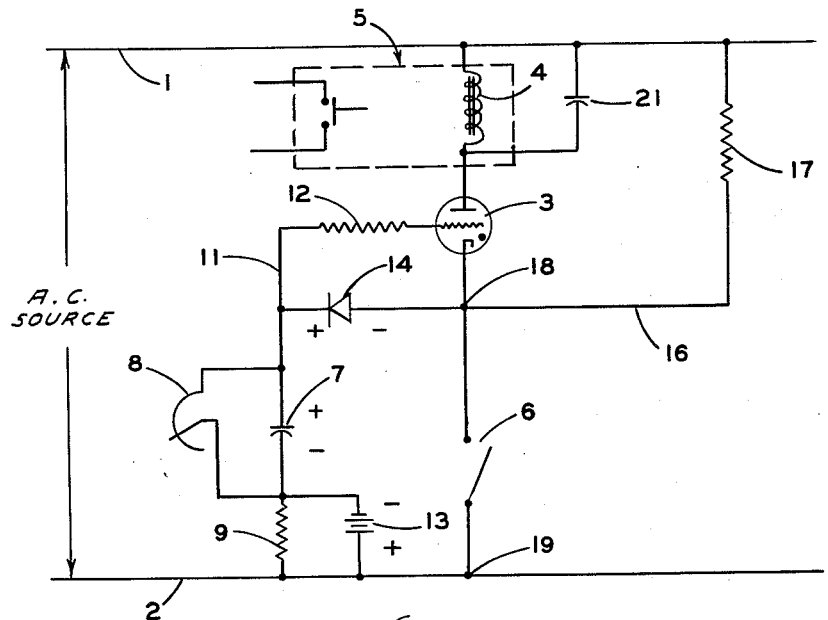
*fig. 1*
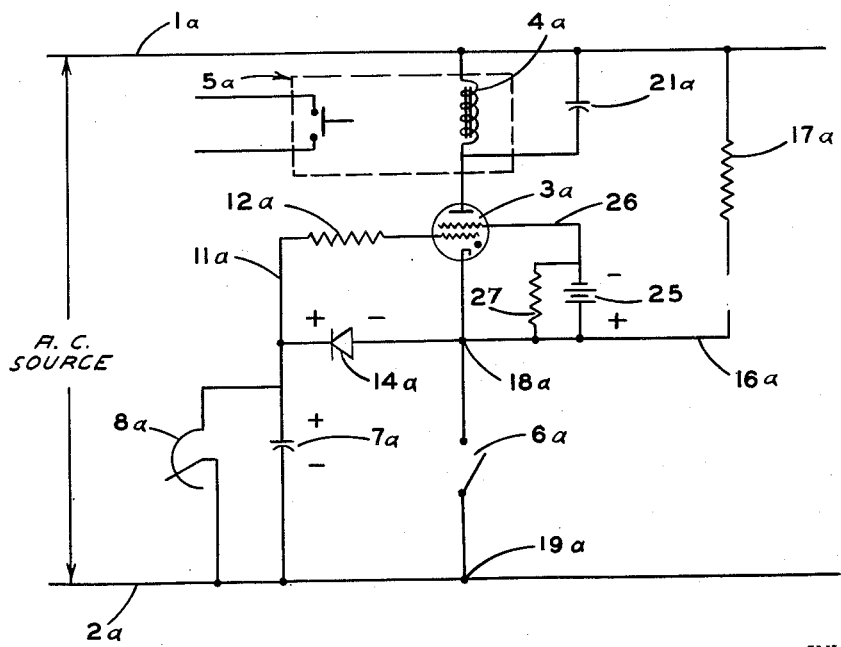
*fig. 2*
INVENTOR.
STUART C. ROCKAFELLOW
BY
ATTORNEY

United States Patent Office 2,761,967
Patented Sept. 4, 1956

2,761,967
TIMING RELAY

Stuart C. Rockafellow, Farmington, Mich., assignor to Robotron Corporation, Detroit, Mich., a corporation of Michigan Application November 10, 1952, Serial No. 319,760

8 Claims. (Cl. 250—27)

This invention relates to an electronic timing circuit and particularly to a type thereof wherein a load is energized immediately upon the closing of an initiating switch, remains energized for a predetermined period of time thereafter and is then automatically de-energized.

While many kinds of electronic timing circuits have previously been disclosed in the art, these circuits have, insofar as I am aware, been all burdened with one or more disadvantages. In some of these circuits, a relay is required to accomplish the timing act in addition to the relay, or other load, which the circuit is intended to control. Others require the conduction of a tube in order to open the relay being controlled, or to de-energize such other load as may be associated with said circuit, and hence, if such tube should fail, the circuit would not open but instead remain closed, or energized, indefinitely. This would cause the timing function to run beyond what was intended and this has in the past often been a source of considerable damage to the equipment being controlled. Other circuits have been complex and therefore expensive to construct, some have been unreasonably delicate in operation and therefore expensive in maintenance and still other circuits have been unreliable in operation.

Accordingly, a principal object of the invention has been to provide an electronic timing circuit which is extremely simple in its construction and which will be reliable in operation.

A further object of the invention is to provide an electronic timing circuit, as aforesaid, requiring no mechanical relays.

A further object of the invention is to provide an electronic timing circuit, as aforesaid, which does not require the conduction of a tube to effect opening thereof, but which instead will automatically de-energize its load upon the termination of conduction by a selected tube regardless of whether said termination of said conduction is in response to the control function or is because of the tube's becoming burned out.

A further object of the invention is to provide an electronic timing circuit which is capable of being composed of rugged parts and which will therefore have few maintenance requirements.

A further object of the invention is to provide an electronic timing circuit which will be highly accurate.

A further object of the invention is to provide an electronic timing circuit which will be adjustable within limits commonly secured by circuits of this type.

Other objects and purposes of the invention will become apparent to persons acquainted with apparatus of this general type upon the reading of the following specification and examination of the accompanying drawing.

In the drawing:

Figure 1 is a schematic diagram of an electronic timing circuit embodying the invention and adapted for controlling a relay.

Figure 2 is a schematic diagram of a modified circuit embodying the invention.

In general

In general the invention contemplates an electric discharge device, as a thyratron, in series with a load, as the winding of a relay, a capacitor connected to the grid of said thyratron, means normally imposing at a point between the principal electrodes of said thyratron an electrostatic charge comprising a bias which is negative with respect to the cathode and of magnitude sufficient to block said thyratron, means operative while an initiating switch is open for charging said capacitor to a positive potential on the side thereof connected to the grid of said thyratron and thereby to overcome said negative bias and permit conduction through said thyratron, connections by which said switch terminates said charging simultaneously with the placing of potential on the principal electrodes of the thyratron and time constant means also commencing operation upon the closing of said switch for permitting the discharge of said capacitor at a controllable rate, whereby to determine a period of time after the closing of said initiating switch at which said negative bias is no longer dominated by said positive charge and will again operate to block the thyratron.

Detailed description

Looking now at Figure 1, there are shown line conductors 1 and 2 which are connectible to opposite sides of a source of alternating potential. An electric discharge device 3, for example a thyratron, is connected by its anode through the winding 4 of a relay 5 to one of said line conductors, as the conductor 1, and the cathode is connected through the initiating switch 6 to the other of said line conductors, as the conductor 2. It will be understood that said initiating switch may be any type of switch, manual or automatic, and it may in some instances be a further electronic circuit.

The capacitor 7 is connected in parallel with a resistance 8, here a potentiometer, to form the time-constant circuit, of which one end is connected through a resistance 9 to the line conductor 2 and the other end is connected by the conductor 11 through a resistance 12 to the grid of the thyratron 3. A source 13 of constant bias-potential, here a battery, is connected in parallel with the resistance 9. A rectifier 14 is connected at its positive side between said time-constant circuit and the resistance 12 and at its negative side to the cathode of the thyratron. A further conductor 16 connects said cathode through a relatively high resistance 17 to the line conductor 1.

The capacitor 21 is preferably connected around the winding 4 of the relay 5 in a conventional manner for the purposes of holding said relay winding energized on the opposite pulses of said alternating source from those which pass through said thyratron.

With the initiating switch 6 open as appearing in Figure 1, the line potential is not imposed upon said thyratron and hence it will not be conductive. Positive pulses from the line conductor 1, will however, pass through the resistance 17, rectifier 14, and the resistances 8 and 9 to the line conductor 2. This will charge the capacitor 7 to a positive potential on the side thereof which is connected to the grid of thyratron 3. The battery 13 simultaneously acts through the resistance 8 to impose a negative potential onto the grid of the thyratron 3. However, the positive potential imposed on the grid by the capacitor 7 substantially supersedes the negative potential from the battery 13 and thereby will render the thyratron conductive as soon as a potential is placed across its principal electrodes. Thus, so long as the switch 6 remains open the thyratron is in conductive condition through the positive charge on its grid but it will not conduct until a suitable potential is placed upon its principal electrodes.

The initiating switch 6 may now be closed and a potential from the line conductors 1 and 2 is immediately placed upon the principal electrodes of the thyratron and the same will conduct and the load, here the winding 4 of the relay 5, will become energized.

Simultaneously, the closing of said switch 6, by providing a direct path from the point 18 to the point 19, will bring the point 18 substantially to the potential of the line conductor 2 and thereby terminate the charging of the capacitor 7. Said capacitor will continue to hold the thyratron 3 conductive but it will commence discharging through the resistance 8 at a rate determined in a known manner by the magnitude of said resistance. At a point determined by the relative magnitudes of the charge on said condenser and the value of said resistance, the positive charge imposed on the grid of the thyratron 3 will eventually become sufficiently less than the negative charge simultaneously imposed on said grid from the battery 13 that said negative charge will predominate and the thyratron will become blocked. This, then, de-energizes said relay 5 at a precisely predeterminable period of time following the closing of the initiating switch 6.

The charging of said condenser in the manner outlined above will now be resumed and the system will very quickly return to a condition for executing a further timing function upon the switch 6 again being closed.

Turning now to the modification shown in Figure 2, the greater part of the circuit is identical with that set forth above with respect to Figure 1 and all of such identical parts are indicated by numerals corresponding to those used with respect to Figure 1. Inasmuch as the description above set forth with respect to Figure 1 will equally well describe the parts so numbered in Figure 2, no further detailed discussion will be necessary, excepting as required to explain the parts of the circuit of Figure 2 which are different from the circuit of Figure 1.

In place of the battery 13 being connected to the same grid as that to which the capacitor 7 is connected, as shown in Figure 1, in the circuit of Figure 2 the source of constant potential, here the battery 25, is connected between the conductor 16a and a second grid 26 of the thyratron 3a. A resistor 27 is connected in parallel with the battery 25 in the same manner as the resistor 9 is connected in parallel with the battery 13 in Figure 1. The functioning of the circuit shown in Figure 2 is precisely the same as the functioning of the circuit shown in Figure 1 excepting that here the constant negative potential is applied to a separate grid 26 in place of being superimposed onto the same grid as that to which the capacitor is connected. The functioning of the constant negative potential from said battery 25 and the varying positive potential supplied by the capacitor 7a, insofar as they render the thyratron 3a conductive and non-conductive, will be the same as the functioning of the corresponding circuits of Figure 1 and hence do not need to be detailed.

While the winding 4 of the relay 5 has been assumed throughout as the load to be energized or de-energized by the timing circuit of this invention, it will be recognized that while the circuit is advantageous for this purpose it is by no means limited thereto and that other types of loads may be utilized herein with a variety of further advantageous results.

It will be recognized while the values ascribed to the various parts of the circuit as above set forth are of importance in determining its correct functioning, it is believed that the general knowledge of the art will, in spite of the novelty of the circuit, be fully capable of properly designing the circuit and selecting such necessary values in the light of the disclosure herein set forth. Hence, such further details are believed unnecessary here.

While I have set forth certain specific embodiments of the invention for the purpose of illustrating same, it will be recognized that a variety of other modifications may be made in the circuits herein expressly set forth without departing from the scope of the invention and such variations are to be included in the hereinafter appended claims excepting as said claims by their own terms expressly require otherwise.

I claim:

1. In a timing circuit the combination: a thyratron having an anode, a cathode and a grid; means connecting said anode to a first side of a source of alternating potential and means connecting said cathode to the second side of said source, a load being included in series in the anode circuit of said thyratron and an initiating switch being included in the cathode circuit thereof; means including a source of constant negative potential for applying a negative potential of constant value intermediate the anode and cathode of said thyratron; a time constant circuit including a capacitor connected at one end to said grid and at the other end to said second side of said source; a rectifier connected between said grid of said tube and the cathode thereof, said rectifier being of such sense that the side of said capacitor which is connected to said grid will be charged to a positive value with respect to said cathode; and means including a resistance of relatively high value connecting said cathode to said first side of said source.

2. The apparatus as that defined in claim 1 wherein the connection from said time constant circuit to said second side of said source includes a further resistance and said source of constant potential is connected in parallel with said further resistance and the circuit formed thereby is connected between said second side of said source and the end of said capacitor which is remote from connection with the grid of said thyratron.

3. The apparatus as that defined in claim 1 wherein the connection from said time constant circuit to said second side of said source includes a further resistance and said source of constant potential is connected in parallel with said further resistance and the circuit formed thereby is connected between said second side of said source and said other end of said time constant circuit.

4. The device as claimed in claim 1 wherein the source of constant potential is connected in parallel with a resistance and the circuit formed thereby is connected between the cathode of said thyratron and a second grid located therein.

5. In a timing circuit including a load, the combination comprising: an electric discharge tube having an anode, a cathode and a grid, and means connecting said load in series with said anode and to one side of a source of alternating potential; an initiating switch and means connecting said switch in series with said cathode and to the other side of said source of alternating potential; means for applying a negative potential of constant value intermediate said anode and cathode of said electric discharge tube; a time constant circuit comprising a capacitor and resistance in parallel with each other, said time constant circuit being connected at one end to said grid of said tube and at the other end to said other side of said source; means including a rectifier connecting said one end of said time constant circuit to said one side of said source, the sense of said rectifier being such that the side of said capacitor which is connected to said grid will be charged to a positive value with respect to said cathode and means connecting said initiating switch around said time constant circuit, whereby upon the closing of said initiating switch both ends of said time constant circuit are brought to the same potential simultaneously with the placing of an energizing potential on the anode and cathode of said tube.

6. In a timing circuit including a load, the combination comprising: a thyratron having an anode, a cathode and a grid, and means connecting said load in series with said anode and to one side of a source of alternating potential; an initiating switch and means connecting said switch in series with said cathode and to the other side of said source of alternating potential; a time constant circuit comprising a resistance and capacitor in parallel with each other; a conductor connecting one end of said time constant circuit to said grid; a source of negative potential and a resistance arranged in parallel with each other and connected at one end for supplying negative potential through the resistance of said time constant circuit to said grid and connected at its other end to said other side of said source of alternating potential; a rectifier connecting said one end of said time constant circuit directly to said cathode and a further means including a relatively high resistance connecting said cathode to said one side of said source of alternating potential, said rectifier being arranged in such sense that the side of said capacitor which is connected to said grid will be charged to a positive value with respect to said cathode.

7. In a timing circuit including a load, the combination comprising: a thyratron having an anode, a cathode and a grid; means connecting said load in series with said anode and to one side of a source of alternating potential; an initiating switch and means connecting said switch in series with said cathode and to the other side of said source of alternating potential; means for applying a negative potential of constant value intermediate said anode and cathode; a time constant circuit comprising a capacitor and resistance in parallel with each other, said time constant circuit being connected at one end to said grid and at the other end to said other side of said source; means including a rectifier connecting said one end of said time constant circuit to said one side of said source, the sense of said rectifier being such that the side of said capacitor which is connected to said grid will be charged to a positive value with respect to said cathode; and means connecting said initiating switch in parallel with said time constant circuit.

8. In a timing circuit including a load, the combination comprising: a thyratron having an anode, a cathode and a pair of grids; means connecting said load in series with said anode and to one side of a source of alternating potential; an initiating switch and means connecting said switch in series with said cathode and to the other side of said source of alternating potential; a time constant circuit comprising a resistance and capacitor in parallel with each other; a conductor connecting one end of said time constant circuit to one of said grids, the other end of said time constant circuit being connected to said other side of said source; conductive means including a rectifier connecting said one end of said time constant circuit to said cathode, said rectifier being sensed so that the side of said capacitor which is connected to said one of said grids will be charged to a positive value with respect to said cathode; a second conductive means including a resistance of relatively high value connecting said cathode to said one side of said source; and a source of negative potential connected to the other of said grids.

References Cited in the file of this patent

UNITED STATES PATENTS

| | | |
|---|---|---|
| 2,337,905 | Livingston | Dec. 28, 1943 |
| 2,471,834 | McDowell et al. | May 31, 1949 |

FOREIGN PATENTS

| | | |
|---|---|---|
| 448,833 | Great Britain | June 16, 1936 |